United States Patent [19]

Tingley

[11] Patent Number: 5,885,685
[45] Date of Patent: Mar. 23, 1999

[54] WOOD STRUCTURAL MEMBER HAVING MULTIPLE FIBER REINFORCEMENTS

[76] Inventor: Daniel A. Tingley, 3310 SW Willamette Ave., Corvallis, Oreg. 97333

[21] Appl. No.: 866,858

[22] Filed: May 30, 1997

Related U.S. Application Data

[60] Division of Ser. No. 330,438, Oct. 28, 1994, Pat. No. 5,648,138, which is a continuation-in-part of Ser. No. 206,411, Mar. 4, 1994, Pat. No. 5,641,553, and a continuation-in-part of Ser. No. 37,580, Mar. 24, 1993, Pat. No. 5,362,545.

[51] Int. Cl.$^6$ ........................................ B32B 5/12
[52] U.S. Cl. .......................... 428/105; 428/106; 428/107; 428/109; 428/110; 428/113; 428/114
[58] Field of Search .................... 428/105, 106, 428/107, 109, 110, 113, 114

[56] References Cited

U.S. PATENT DOCUMENTS

| | | | |
|---|---|---|---|
| 2,536,183 | 1/1951 | Jamieson | 428/525 |
| 3,413,188 | 11/1968 | Allen | 161/195 |
| 3,890,077 | 6/1975 | Holman | 425/111 |
| 4,108,351 | 8/1978 | Hough | 229/62 |
| 4,242,406 | 12/1980 | El Bouhnini et al. | 428/236 |
| 4,312,162 | 1/1982 | Medney | 52/309.16 |
| 4,495,020 | 1/1985 | Nakabayashi et al. | 156/134 |
| 4,615,163 | 10/1986 | Curtis et al. | 52/730 |
| 4,833,700 | 5/1989 | Harpell et al. | 428/113 |
| 4,965,973 | 10/1990 | Engebretsen | 52/223 R |
| 5,000,808 | 3/1991 | Deviney | 156/178 |
| 5,006,390 | 4/1991 | Kavesh et al. | 428/105 |
| 5,026,593 | 6/1991 | O'Brien | 428/215 |
| 5,135,793 | 8/1992 | Socha | 428/74 |

FOREIGN PATENT DOCUMENTS 4149346  5/1992  Japan .

OTHER PUBLICATIONS

Rowlands et al., "Fiber–Reinforced Wood," *Wood and Fiber Science*, Jan. 1986, V. 18(1), pp. 39–57.

Wood Design Focus, A Newsletter of Contemporary Wood Engineering, vol. 4, No. 2, Summer 1993, R.J. Leichti, Editor.

Von de Kuilen, Proceedings of the 1991 International Timber Engineering Conference, vol. 3, Sep. 2–5, 1991, pp. 226–233.

Tingley, Proceedings of the 1988 International Conference on Timber Engineering, vol. 1, Sep. 19–22, 1988, pp. 422–427.

Tingley, Reinforced Glued–Laminated Wood Beams, 96 page Thesis accepted Nov., 1987 by the University of New Brunswick (Canada) as partial fulfillment for M.S. Eng., Dept. of Civil Engineering.

Tingley, "Predicting Strength Criteria for Kevlar and Fiberglass Reinforced Plastic (KRP & FRP) Glued Laminated Beams," pp. 301–304 from vol. 2 of the Proceedings of the Second *Pacific Engineering Conference*, 1989.

*Primary Examiner*—Terrel Morris
*Attorney, Agent, or Firm*—Stoel Rives LLP

[57] ABSTRACT

A wood structural member of the present invention, such as a laminated wood beam, a wood I-beam, or a truss, includes multiple synthetic fiber reinforcements. In a preferred embodiment, the reinforcements include synthetic fibers that are arranged parallel to one another and aligned with the longitudinal direction of the reinforcement and, therefore, accordingly the wood structure. The fibers are maintained in position by a resin encasement. The surface of a reinforcement to which a wood segment is bonded is adapted so that the reinforcement may be bonded to the structural member with nonepoxy adhesives, such as resorcinol, commonly used in the laminated beam industry.

36 Claims, 6 Drawing Sheets

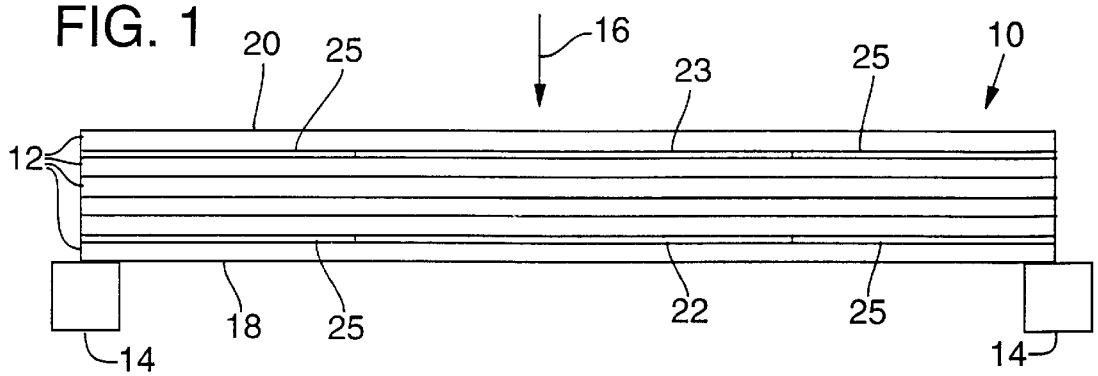
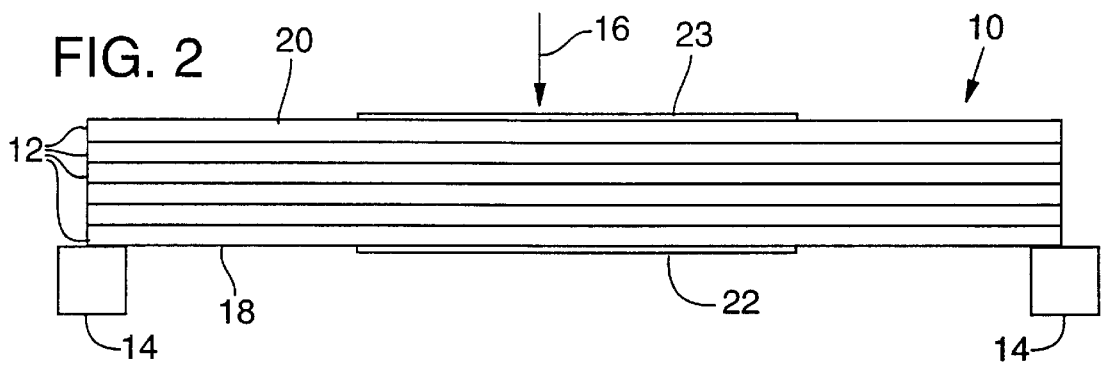
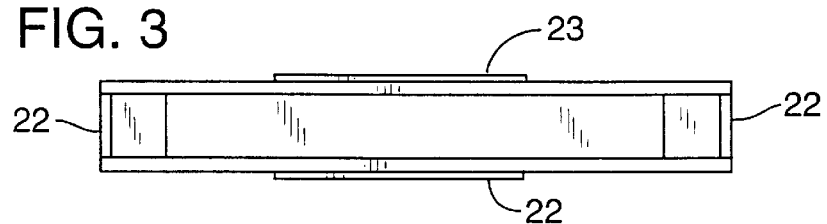
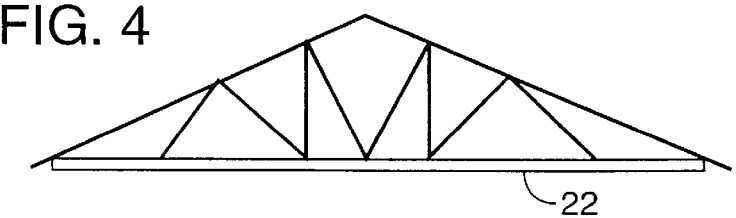

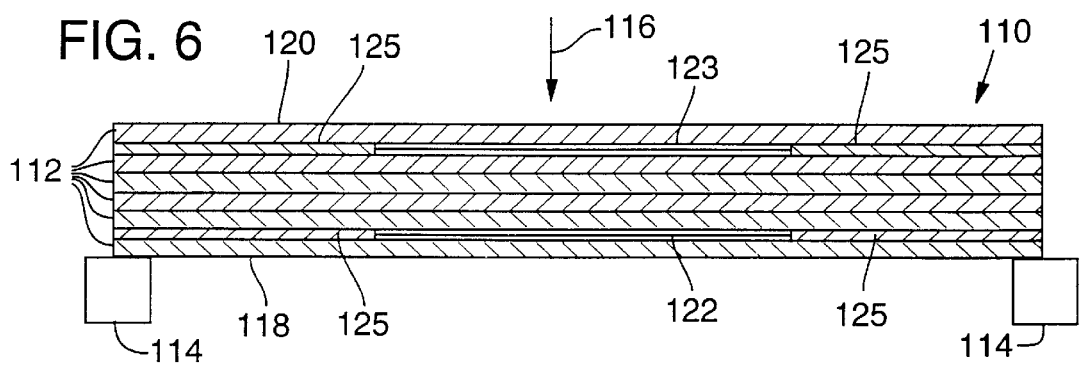
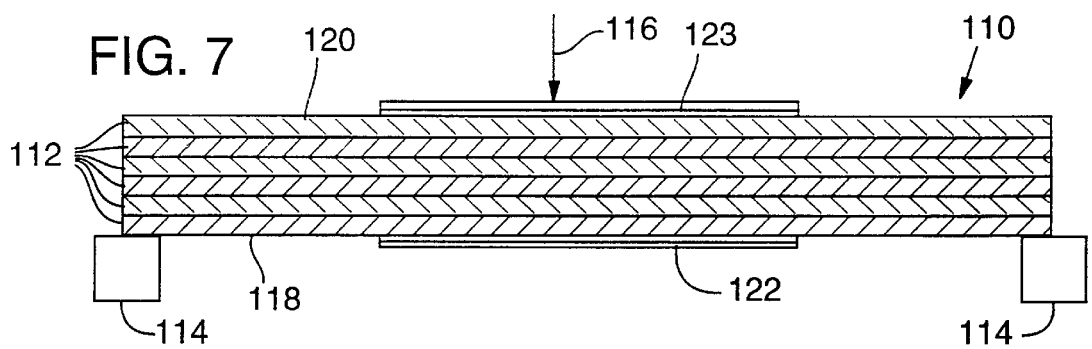
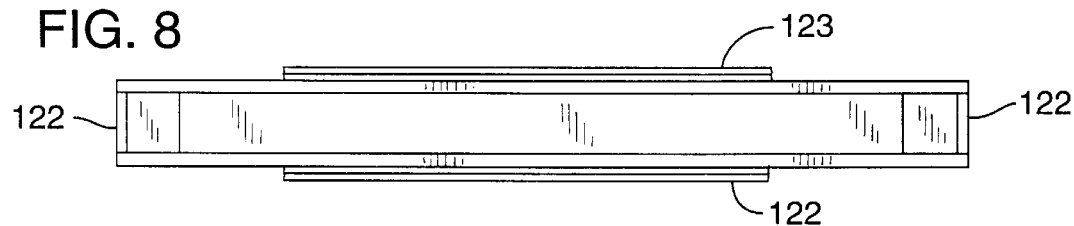
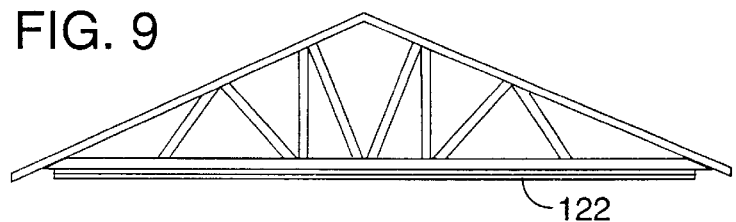

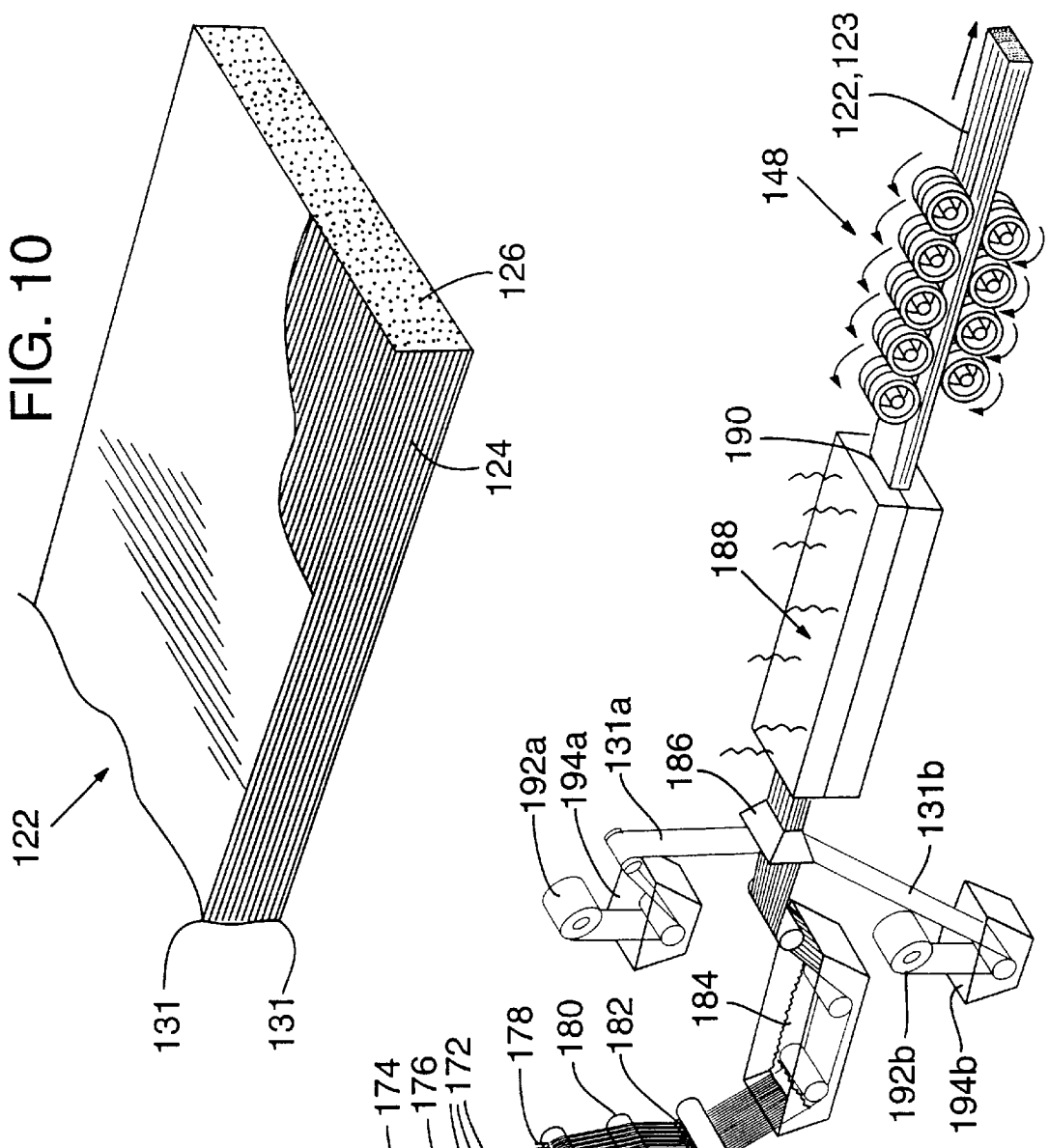

WOOD STRUCTURAL MEMBER HAVING MULTIPLE FIBER REINFORCEMENTS

RELATED APPLICATIONS

This is a division of application Ser. No. 08/330,438, filed Oct. 28, 1994, now U.S. Pat. No. 5,648,138 which is a continuation-in-part of application Ser. No. 08/206,411, filed Mar. 4, 1994, now U.S. Pat. No. 5,641,553 and a continuation-in-part of application Ser. No. 08/037,580, filed Mar. 24, 1993, now U.S. Pat. No. 5,362,545.

BACKGROUND OF THE INVENTION

This invention pertains to reinforcement of structural wood, such as beams, columns and trusses. More particularly, the present invention pertains to the use of unidirectional fibers as a reinforcement in structural wood members to improve the tensile or compressive loading of the wood member.

DESCRIPTION OF THE RELATED ART

To remain competitive, wood product engineers have had to adopt innovative designs in combination with alternative materials to enhance the structural limits and cost effectiveness of engineered wood products. Examples of engineered wood products include glued laminated wood beams, laminated wood columns, wood I-beams, and wood trusses. The prior art is replete with examples of these engineered wood products.

The preferred method for fabrication of engineered wood products is to connect wood boards with a resorcinol-formaldehyde resin. Resorcinol-formaldehyde is the preferred adhesive because it is low cost, workable, and has a lower toxicity, particularly as compared to epoxy resins.

To improve the effectiveness of engineered wood products, recent studies have looked at using high strength fiber panels as reinforcement. At a 1988 International Conference on Timber Engineering a paper was presented entitled "Reinforced Glued-Laminated Wood Beams" by Mr. Dan A. Tingley (hereinafter "Tingley Paper") that disclosed the use of reinforced plastics (RP) in glue laminated wood beams (glulams). The Tingley paper disclosed test results of glulams using aramid fibers sold under the trademark KEVLAR for reinforced plastic panel(s) located at high stress areas. The results indicated a 19% improvement in ultimate load-to-failure of beams with KEVLAR reinforcement as opposed to nonreinforced beams. However, the Tingley paper does not disclose a method for using resorcinol-formaldehyde resin ("resorcinol") as an adhesive for the RP to wood laminae is connection. On the contrary, the Tingley paper teaches away from using resorcinol adhesives by teaching the use of epoxies to adhere the RP to the surrounding wood laminae even though the less expensive commercial adhesive, resorcinol, was used between the other layers of wood laminae.

What is desired, therefore, is a reinforcement panel that can be adhesively adhered to the wood structure, preferably in the same manner as the wood laminae themselves are adhered together. Further, such a panel should be resistant to moisture degradation and have dimensional stability. Moisture degradation generally refers to the ability of a material to maintain its integrity when subjected to moisture. Dimensional stability generally refers to the ability of a material to resist shrinking or expanding when subjected to moisture.

Another area of related art is the fabrication process of pultrusion. Pultrusion is defined as a continuous manufacturing process for producing lengths of fiber reinforced plastic parts. Pultrusion entails pulling flexible reinforcing fibers through a liquid resin bath and then through a heated die where the RP is shaped and the resin is cured. Pultrusion is known for its ability to fabricate a continuous length of RP and to accommodate custom placement and orientation of fibers, which allows for the mechanical properties of the pultruded part to be designed for a specific application. Pultruded parts have longitudinally aligned fibers for axial strength and obliquely aligned fibers for transverse strength.

SUMMARY OF THE INVENTION

The present invention improves upon the teachings of the prior art of using RP panels as reinforcement in laminated wood beams and other wood structural members. The present invention provides a panel that comprises many thousands of high strength fibers, all of which are arranged substantially parallel with one another and aligned with the longitudinal axis of the reinforcing panel. The present invention also allows RP panels to be adhered to a wood structure with the same adhesive with which the wood laminae are adhered together and with nonepoxy adhesives.

In a first preferred embodiment, fibers that are closest to the surface are abraded to "hair up" the panel's surface so that commercial grade adhesives, such as resorcinol, may be used to adhere the RP panel to the wood structure. In a second preferred embodiment, a reinforcement panel includes a plurality of reinforcement fibers embedded in a resin encasement and an adhesively connected cellulose surface material that is impregnated with a polyester resin. The reinforcement panel is adhesively affixed to a wood structure at an area of high stress such that the surface material is sandwiched between the resin encasement and the wood structure.

Cellulose surface materials, such as paper or wood, impregnated with a polyester resin have dimensional stability and are resistant to moisture degradation. Further, cellulose surface materials have a surface similar to that of the wood members and therefore provides improved adhesion of the panel to the wood structure, preferably with an inexpensive adhesive such as resorcinol.

A reinforcement panel having superior adhesion properties is manufactured by encasing a plurality of reinforcement fibers in a resin encasement and impregnating a cellulose surface material with a polyester resin. The surface material is adhesively connected to a first side of the panel. A wood structure is created by adhesively connecting a plurality of wood members. The reinforcement panels are adhesively affixed to the wood structure at an area of high stress such that the surface material is sandwiched between the resin encasement and the wood structure. Preferably, the wood structure comprises a plurality of wood laminae adhesively connected and further including adhesively affixing the panels between an outermost lamina and an adjacent lamina.

The present invention also comprises mixed fiber RPs wherein there is a core of continuous length aligned fibers and an outer layer (or layers) of noncontinuous fibers that have been abraded to hair up the RP to facilitate adhesion of the panel to a wood structure. Mixed fiber RPs are significant where design considerations call for using a fiber which cannot hair up. For example, to fabricate a panel having a high strength in compression, carbon fibers are sandwiched between "KEVLAR" because carbon has a superior modulus of elasticity in compression over most other commercial fibers and "KEVLAR" can hair up for a superior adhesive surface, whereas a panel comprising only carbon fibers would require epoxy based adhesives to adhere the panel to the adjacent laminae of wood. Alternatively, fiberglass fibers, including S-glass or E-glass, may be sandwiched between "KEVLAR."

The present invention also comprises the fabrication process of making the panel wherein substantially all the fibers are arranged and aligned and tensioned while the resin is cured in a heated die.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is an elevation view of a wood laminated beam having reinforcing panels of the present invention located between the laminae.

FIG. 2 is an elevation view of a wood laminated beam having reinforcing panels of the present invention located on exterior surfaces thereof.

FIG. 3 is an elevation view of a wood I-beam showing preferred locations of reinforcing panels of the present invention for improving the load-carrying capacity of the I-beam.

FIG. 4 is an elevation view of a wood truss showing a preferred location for a reinforcing panel of the present invention for improving the load-carrying capacity of the truss.

FIG. 5b is an alternative embodiment of the panel shown in FIG. 5a.

FIG. 5c is an alternative embodiment of the panel shown in FIG. 5a.

FIG. 6 is an elevation view of a wood laminated beam having reinforcing panels of the present invention located between the laminae.

FIG. 7 is an elevation view of a wood laminated beam having reinforcing panels of the present invention located on exterior surfaces thereof.

FIG. 8 is an elevation view of a wood I-beam showing preferred locations of reinforcing panels of the present invention for improving the load-carrying capacity of the I-beam.

FIG. 9 is an elevation view of a wood truss showing a preferred location for reinforcing panels of the present invention for improving the load-carrying capacity of the truss.

FIG. 10 is an isometric view of a portion of a panel of the present invention wherein a cut-away view shows the alignment and orientation of the fibers which comprise the panel and the cellulose surface material.

FIG. 13 is an isometric view of a pultrusion process of the present invention which produces an elongate reinforcement panel having substantially all of its fibers arranged parallel to one another and aligned with a longitudinal axis and including a cellulose surface material adhesively attached to each side of the panel.

DETAILED DESCRIPTION OF PREFERRED EMBODIMENTS

Figure 5A:
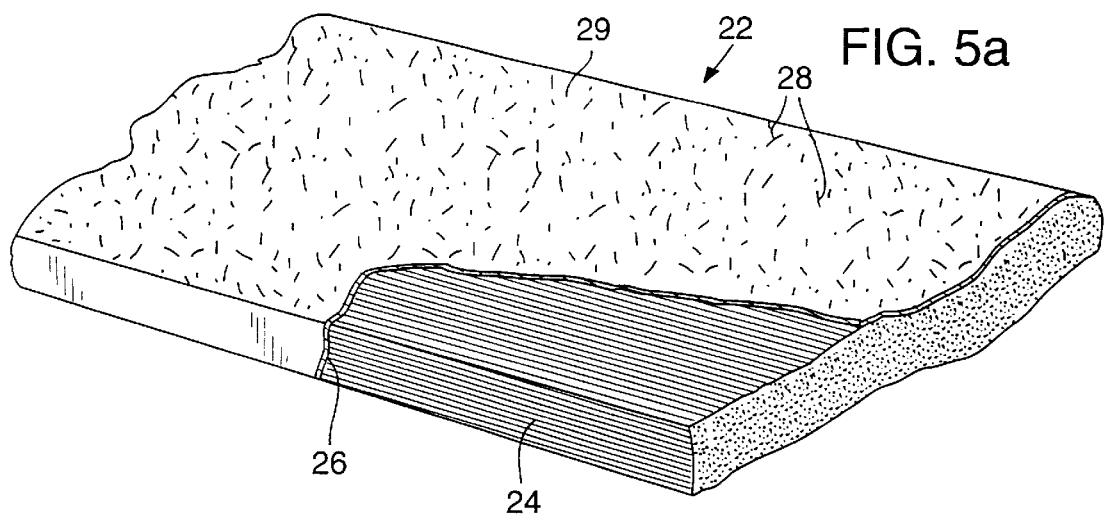
FIG. 5a is an isometric view of a portion of a panel of the present invention, partly cut away to show alignment and orientation of the fiber.

The present invention is best understood by beginning with a description of its use. With reference to FIGS. 1 and 2 there are shown glued laminated wood beams 10 having a plurality of laminae 12. Each lamina 12 is preferably an elongate wood board.

A primary structural use of laminated beams is to span an open area, represented as an area between blocks 14, and support a load as represented by arrow 16. When thusly configured, the lowermost lamina 18 is subjected to a substantially pure tensile stress. Conversely, the uppermost lamina 20 is subjected to a substantially pure compressive stress. Scientists have found that the load-bearing capacity of laminated beams may be substantially increased by adding a reinforcing panel 22 or 23 in the areas of greatest stress; namely, closest to the lowermost lamina or uppermost lamina 18, 20, respectively. Reinforcing panel 22 is distinguished from reinforcing panel 23 because panel 22 is designed for, and located at, areas of high tensile stress, whereas panel 23 is designed for and located at areas of high compressive stress. In FIG. 1 the reinforcing panel 22 is shown between the lowermost lamina 18 and its adjacent lamina and the panel 23 is shown between the uppermost lamina 20 and its adjacent lamina.

In FIGS. 1 and 2 the length of the reinforcing panel is approximately three-fifths of the beam length. Testing has shown, and been disclosed in the prior art, that a reinforcing panel which covers two-fifths to three-fifths of the central portion of the beam provides substantially all the benefit of a full-length reinforcing panel, but at a lower cost per beam. In FIG. 1 the reinforcing panel is mounted between lamina and extends approximately three-fifths of the length of the beam, thus requiring spacers 25 to be located adjacent the ends of the reinforcement panel 22. The spacers 25 may be of wood. When the reinforcing panel is located on the exterior of the beam, as in FIG. 2, no spacers are required.

In a first preferred embodiment of the present invention, and under conditions established above, namely, a simple beam with point loading or uniform loading, the lowermost reinforcing panel 22 will be comprised of a material having high strength in tension whereas the uppermost reinforcing panel 23 will be comprised of materials having a high strength in compression.

It is to be understood that the configurations shown in FIGS. 1 and 2 are suitable for the loading conditions associated with those figures only. If the laminated beams were subjected to different loading, the optimum configuration of locating the reinforcing panel would be different.

For instance, if the laminated beam were cantilevered, design considerations would require that the reinforcing panel having the most strength in tension be located on the upper portion of the beam whereas the reinforcing panel having the most strength in compression would be located on the lower portion of the beam. Also, in a cantilever loading situation the reinforcing panels would not be located at a center of the beam length, but rather would be located along the beam at the areas of maximum strain.

FIGS. 3 and 4 show alternative configurations of wood structural members and preferred locations for mounting the reinforcing panels for maximum benefit of increasing the load bearing capacity of the structural members. FIG. 3 shows a wood I-beam having reinforcing panels along the top, the bottom, and on the web portions at the distal ends. FIG. 4 shows a wood truss having a reinforcing panel 22 mounted at the location of highest tensile stress. FIGS. 1–4 are included herein to show some applications of the reinforcing panel of the present invention and are not intended to include all applications for all types of wood structures for which the reinforcing panel of the present invention is suitable. It is to be understood that the reinforcing panels of the present invention are also suitable for solid wood beams and columns, and other engineered wood structures, such as parallel strand lumber, sometimes referred to as PARALLAM, laminated veneer lumber, oriented strand board, and reconstituted fiber lumber.

A preferred embodiment of the reinforcing panel of the present invention is shown in FIG. 5a. The panel 22 comprises a plurality of synthetic fibers 24 that are arranged parallel to one another and aligned with a longitudinal direction of the panel. The fibers 24 are maintained in their arrangement and alignment by a resin encasement 26 that surrounds the fibers and fills the interstices between the fibers. The panel 22 has been treated, as described below, so that the surface areas 29 that will be adhered to the wood structure have exposed fibers 28 to facilitate adhesion.

The parallel arrangement and longitudinal alignment of the fibers 24 provides a panel having maximum strength because the strength comes from the fibers (not the resin) and the configuration of fibers in the present invention permits the maximum density of fibers. Commonly, reinforced plastic parts have a fiber to resin volume ratio of 40/60. However, the configuration of fibers in the present invention permits fiber to resin volume ratios as high as 60/40, or as high as 70/30 if the reinforcement includes fiberglass fibers such as S-glass or E-glass, when fabricated by the pultrusion method. Furthermore, the configuration of fibers in the present invention facilitates wetting of the fibers by the resin. In fabricating reinforced plastic parts it is very important that the resin fully contact the reinforcing fibers—this is known as wetting. One hundred percent wetting is difficult to achieve with fibers configured in a complicated weave. By providing a fiber configuration of parallel arrangement, the present invention is able to achieve 100% wetting even with high fiber to resin ratios.

Prior to the present invention, reinforced plastic panels could be adhered to wood beams and structures by an epoxy adhesive only, which is more expensive than the adhesives normally used in the preparation of wood laminated products. A commercial grade adhesive that is frequently used in the preparation of laminated wood is resorcinol, which is less expensive than epoxy adhesives. By treating the surfaces of the reinforcing panels 22 to cause the surface to hair up, wherein fibers near the surface 29 are broken and the broken ends 28 are caused to protrude from the resin encasement 26, there is provided a heretofore unknown means for adhering a reinforced plastic panel to a wood structure by means of nonepoxy adhesives. Other nonepoxy adhesives suitable for adhering reinforcing panels 22 to a wood structure include phenol resorcinol, formaldehyde resorcinol, melamine including cross-linked melamine, PVA including cross-linked PVA, isocyanate, polyurethane, and urea-based adhesives.

The preferred method for causing the surface of the reinforcing panel 22 to hair up is by abrading the surface of the panel with 60 grit abrasive in a direction is transverse to the longitudinal direction of the panel. The abrading removes a small portion of the resin encasement and exposes fibers that are closest to the surface. Further abrading breaks individual fibers so that one end of the fiber remains in the resin encasement and one end of the fiber protrudes from the resin encasement providing the hairy surface.

Alternative methods of hairing up the surface of the panel 22 will be apparent to those skilled in the art of reinforced plastic fabrication and include chemically treating the surface of the panel prior to curing the resin encasement so as to cause voids in the surface of the panel as it emerges from a curing die thereby removing portions of the resin and exposing underlying fibers. Another alternative method for causing the surface of the panel to hair up is the use of broken rovings. As will be explained below, all the fibers referred to herein are synthetic fibers and the fiber manufacturing process first produces filaments which are grouped together into strands or fibers which are further grouped together into twisted strands, known as yarn, or untwisted strands, known as rovings. Typically the rovings or yarns are woven into a fabric for use in a fabrication process. One type of roving that is available is referred to as a broken roving wherein the roving has been subjected to forces, which fray some of the individual fibers of the roving. By using the broken rovings as a source of fibers to be aligned and encased in the resin encasement, the panel which emerges has surfaces which are haired up.

The panel shown in FIG. 5a is the preferred embodiment of a panel to be used to reinforce the areas of a wood beam 10 subjected to high tension stress. Preferably, the fibers 24 would be aramid fibers or carbon fibers. Aramid fibers are commercially available as "KEVLAR," and the preferred grade for the present invention is "KEVLAR 49." Alternatively, the fibers could be a high modulus polyethylene which is sold commercially as "SPECTRA" and is sometimes referred to as high performance polyethylene.

Figure 5B:
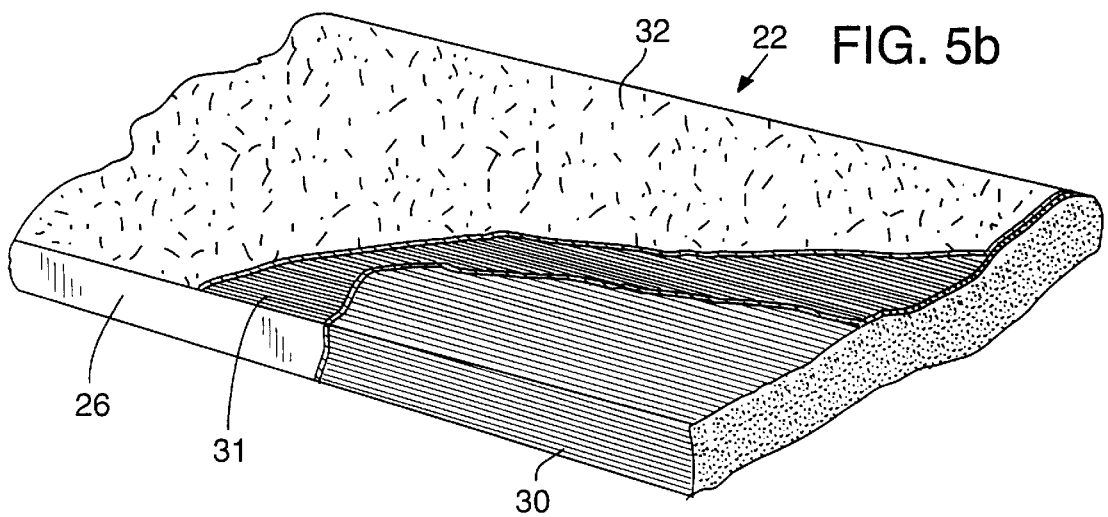

An alternative embodiment of the reinforcing panel is shown in FIG. 5b as a panel having two types of fibers. A first fiber 30 is arranged parallel to one another and aligned with the longitudinal direction of the panel 22 as described above, and a second fiber 31 is arranged between the first type of fibers and a surface 32 that will be adhered to the wood structure. This embodiment is most suitable for circumstances which require a first fiber that will not hair up satisfactorily, such as carbon, "SPECTRA," or fiberglass. Carbon fibers alone are structurally suitable for a reinforcing panel for a wood beam. However, experimentation has shown that it is not possible to adhere the carbon fiber panel to the wood beam with resorcinol adhesive and efforts to hair up the surface of the carbon fiber panel have proved ineffective. Thus, where it is desirable to use carbon, "SPECTRA," or fiberglass as the first fiber 30, it has been found advantageous to overlay the major surfaces of the panel with aramid fibers as the second fiber 31, which are also encased within the resin encasement 26. The use of aramid fibers permits the panel to be haired up as described above so that it may be adhered to wood beams with nonepoxy adhesives such as resorcinol, as well as phenol resorcinol, formaldehyde resorcinol, melamine including cross-linked melamine, PVA including cross-linked PVA, isocyanate, polyurethane, and urea-based adhesives.

Figure 5C:
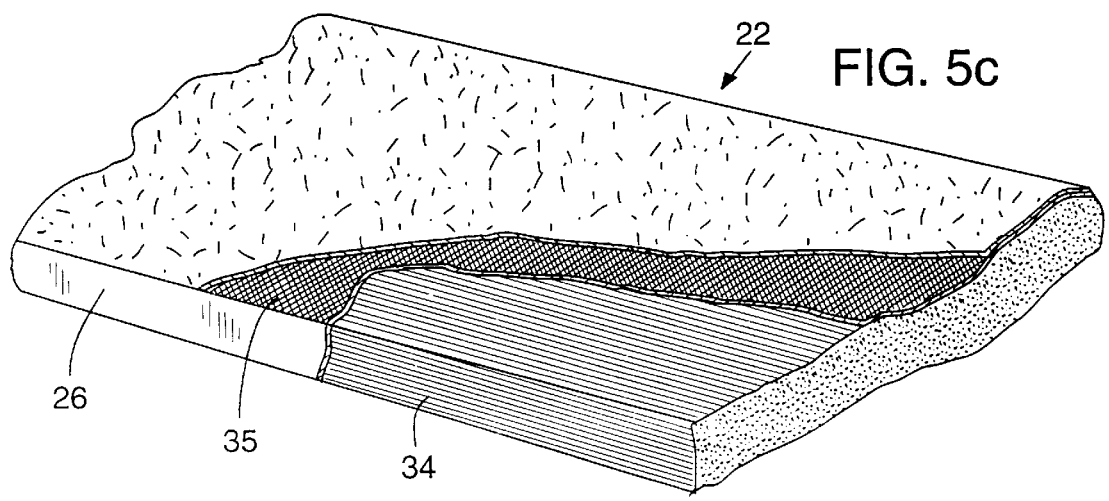

Another alternative embodiment is shown in FIG. 5c as a panel having a first fiber 34 (e.g., carbon, "SPECTRA," or fiberglass, including S-glass or E-glass) and a fiber mat 35 (e.g. aramid), both of which are encased in the resin encasement 26. This embodiment is most suitable for resin encasements that are made of nonepoxy resins. Experimentation with nonepoxy resin encasements has resulted in interlaminar shear failure in the reinforcing panel 22. Thus, although the optimum configuration of fibers in the reinforcing panel for maximum strength is parallel and longitudinally aligned, the fiber mat 35 improves the interlaminar shear strength of the reinforcing panel 22 by providing fibers that are arranged oblique to the longitudinal direction of the panel and thus resist interlaminar strain.

Preferably, the resin 26 used in fabrication of the panel is an epoxy resin. However, alternative embodiments could use other resins such as polyester, vinyl ester, phenolic resins, polyimides, or polystyrylpyridine (PSP). Alternative embodiments of the present invention could use thermoset resins and thermoplastic resins such as poly (ethyleneterephthalate) (PET) and nylon-66.

The reinforcing panel of the present invention provides a panel having an extremely high modulus of elasticity in tension or in compression. However, the reinforcing panel of the present invention has very little lateral strength because substantially all fibers are arranged parallel and aligned longitudinally. A reinforcing panel of the present design is useful only for reinforcing structures where the loads will be unidirectional and of a direction that can be determined and controlled.

With reference to FIGS. 6 and 7 there is shown a wood structure having a plurality of elongate wood members adhesively connected together, which is generally referred to as a glue laminated wood beam (glulam) 110 with a plurality of lamina 112.

A primary structural use of laminated beams 110 is to span an open area, represented as an area between blocks 114, and to support a load as represented by arrow 116. When thusly configured, the lowermost lamina 118 is subjected to a substantially pure tensile stress. Conversely, the uppermost lamina 120 is subjected to a substantially pure compressive stress. Researchers have found that the load-bearing capacity of laminated beams may be substantially increased by adding reinforcing panels 122 and 123 in the areas of greatest stress; namely, closest to the lowermost lamina 118 or uppermost lamina 120. Reinforcing panel 122 is distinguished from reinforcing panel 123 because panel 122 is designed for, and located at, areas of high tensile stress, whereas panel 123 is designed for and located at areas of high compressive stress. In FIG. 6 the reinforcing panels 122 are shown between the lowermost lamina 118 and its adjacent lamina and the panels 123 are shown between the uppermost lamina 120 and its adjacent lamina. In FIG. 7 the reinforcing panels 122 and 123 are shown on the outside of respective lamina 118 and 120.

In FIGS. 6 and 7 the lengths of the reinforcing panels are approximately three-fifths of the beam length. Testing has shown, and been disclosed in the prior art, that a reinforcing panel which covers two-fifths to three-fifths of the central portion of the beam provides substantially all the benefit of a full-length reinforcing panel, but at a lower cost per beam. In FIG. 6 the reinforcing panels are mounted between adjacent lamina and extend approximately three-fifths of the length of the beam, thus requiring spacers 125 to be located adjacent the ends of the reinforcement panels 122. The spacers 125 are preferably made of wood. When the reinforcing panels are located on the exterior of the beam, as in FIG. 7, no spacers are required.

It is within the scope of the present invention that the reinforcement panels could alternatively be affixed to the side of the glue laminated wood beam 110 on the side of one or more lamina 112.

FIG. 8 shows a wood I-beam having reinforcing panels along the top, the bottom, and on the web portions at the distal ends. FIG. 9 shows a wood truss having reinforcing panels 122 mounted at the location of highest tensile stress.

FIGS. 6–9 are included herein to show some applications of the reinforcing panel of the present invention and are not intended to include all applications for all types of wood structures for which the reinforcing panel of the present invention is suitable. It is to be understood that the reinforcing panels of the present invention are also suitable for solid wood beams and columns, and other engineered wood structures, such as laminated veneer lumber, parallel strand lumber such as those products sold under the trademark PARALLAM, oriented strand board, and reconstituted fiber lumber.

Another preferred embodiment of the reinforcing panel of the present invention is shown in FIG. 10. The panel 122 comprises a plurality of synthetic fibers 124 substantially continuous along the length of the panel and arranged substantially parallel to one another and substantially aligned with a longitudinal direction of the panel. The fibers 124 are maintained in their arrangement and alignment by a resin encasement 126 that surrounds the fibers and fills the interstices between the fibers. The panel 122 further includes at least one cellulose surface material 131 adhesively affixed to its surface, as described below, to facilitate improved adhesion of the panel to a wood structure such as the glulam 110. As used herein, resin refers to a class of solid or semi-solid organic products of natural or synthetic origin with no definite melting point, generally of high molecular weight. Most resins are polymers.

The parallel arrangement and longitudinal alignment of the fibers 124 provides a panel having maximum strength because the strength comes from the fibers (not the resin). Commonly, reinforced plastic parts have a fiber to resin volume ratio of 40/60. The configuration of fibers in the parent invention permits fiber to resin volume ratios as high as 60/40 when fabricated by the pultrusion method. Furthermore, in fabricating reinforced plastic parts it is very important that the resin fully impregnates the reinforcing fibers, known as wetting. One hundred percent wetting is difficult to achieve with fibers configured in a complicated weave. However, by providing a parallel fiber configuration it is possible to achieve 100% wetting even with high fiber to resin ratios. When constructed of wood, the cellulose surface material 131 of the present invention provides additional transverse strength to the panel permitting an even higher fiber-to-resin volume ratio of approximately 65/35, therefore permitting more fibers to be used in the panel creating an even stronger panel.

Previously, reinforced plastic panels were adhered to wood structures with epoxy because of its superior adhesive properties. However, epoxy, as compared to polyester resins and particularly resorcinol, is difficult to work with, more expensive and more toxic. Therefore, it is preferable to use for all bonds between wood structure members resorcinol or other nonepoxy adhesives such as phenol resorcinol, formaldehyde resorcinol, melamine including cross-linked melamine, PVA including cross-linked PVA, isocyanate, polyurethane, and urea-based adhesives. To permit the use of a non-epoxy adhesive, such as resorcinol, with the plastic reinforcement panel 122 the cellulose surface material 131 is adhesively affixed to one or both sides of the panel 122. Resorcinol and other similar adhesives bond with what can be described as a physical bond to the surface of a material, and thus creates a much stronger bond with a surface that is textured, such as a wood or paper surface. Therefore, by using a cellulose surface material 131 which is similar to the lamina 112, resorcinol will make a substantially equivalent bond between the cellulose surface material 131 and the lamina 112, as it would between wood laminae 112. Further, with a wood surface material-to-lamina bond, the wood surface is not adhered to the lamina with a different material and therefore complying with governmental code regulations is simplified. Code regulations already exist for bonding wood to wood so new code regulations would not need to be developed for a wood surface material-to-lamina bond, as would be required for many other materials.

When the panels are sandwiched between two lamina 112, as shown in FIG. 6, then the cellulose surface material 131 is affixed to both sides of the panels 122. In contrast, if the panels 122 are not sandwiched between lamina 12, as shown in FIG. 7, then the cellulose surface material 131 needs to be on only the sides of the panels 122 being adhesively adhered to the wood structure.

Under loaded conditions of the wood structure, the panels 122 and associated cellulose surface materials 131 will be exposed to high interlaminar shear stresses. Due to such high stresses, the cellulose surface material 131 needs to be treated to maximize its dimensional stability. If the panels 122 or cellulose surface material 131 had low dimensional stability, then the strength of the wood structure in which the panel 122 is attached would have less strength than a wood structure having a panel with high dimensional stability. Further, wood structures are often subjected to moisture that could impregnate the cellulose surface material 131 causing moisture degradation of the cellulose surface material 131. Moisture degradation may lead to the failure of the interlaminar adhesion causing failure of the wood structure.

To provide a panel with improved adhesion while providing both dimensional stability and protection against moisture degradation, the cellulose surface material 131 is impregnated with a polyester resin. The specific polyester resin is chosen such that it will impregnate the surface material 131 within a relatively short time. It is apparent that depending upon the specific polyester resin chosen, and the type and thickness of the cellulose surface material 131, the length of time required for adequate penetration will vary considerably. A preferred polyester resin is the orthoresin diallyh phthalate (DAP), which has a sufficiently low molecular weight and viscosity to provide adequate impregnation of the cellulose surface material 131 within a reasonable time. Preferably, the cellulose surface material 131 impregnated with DAP is co-cured at the same time as the panel 122 is cured. Other polyester resins, such as polyester and polyester with styrene, are also acceptable for impregnating the cellulose surface material 131.

Alternatively, the surface material 131 can be adhesively adhered to the panel 122 without previously impregnating it with the polyester resin by applying the cellulose surface material 131 directly onto the wet resin-soaked fibers of the panel 122 and partially embedding it in the resin encasement. In this manner, the resin will impregnate the cellulose surface material 131, thereby providing dimensional stability and resistance to moisture degradation.

Another alternative is to use a polyester resin impregnated cellulose surface material 131 and adhesively adhering it to the panel 122 after the panel 122 has been previously cured, generally referred to as a post cure process.

Irrespective of the particular method chosen, the exposed side of the cellulose surface material 131 provides improved adhesion characteristics for adhering the panel 122 to the wood structure which provides a previously unknown means for adhering reinforced plastic panels to wood structures by means of nonepoxy adhesives.

A preferred cellulose fiber material is a 60-lb weight, no-wax Kraft paper, though any type of paper of suitable weight, such as 30–90 lb paper, could also be used.

Another preferred cellulose surface material is a soft wood, such as Radiatta or Ponderosa pine, though other types of wood are also acceptable. The wood is preferably a sliced or rotary cut veneer as opposed to using a veneer with a sanded surface, because sanding creates a surface that is difficult to obtain an adequately strong bond with an adhesive, such as resorcinol. Preferably, the individual pieces of the wood veneer are held together by finger joints mounted on a polyester mat backing sheet, or alternatively, tape, with the polyester side toward the panel 122. The wood surface material is preferably $2/100$ of an inch thick, but a general range of $1/100$ to $25/100$ of an inch thick is also acceptable. Depending upon the actual polyester resin used, the thickness of the cellulose surface material is preferably such that the polyester resin fully impregnates the cellulose surface material to provide maximum resistance to moisture degradation and dimensional stability, while providing improved adhesion characteristics.

The panel shown in FIG. 10 is a preferred embodiment of a panel to be used to reinforce the areas of a wood beam 110 subjected to high tension stresses. Preferably, the fibers 124 would be aramid fibers, carbon fibers, or fiberglass fibers, including S-glass or E-glass. Aramid fibers are commercially available under the trademark KEVLAR, and the preferred grade of fibers for the present invention is available under the trademark KEVLAR 29. Alternatively, the fibers could be a high modulus polyethylene which is sold commercially under the trademark SPECTRA and is sometimes referred to as high performance polyethylene.

Preferably, the resin 126 used in the fabrication of the panel is an epoxy. However, alternative embodiments could use other polymers such as polyesters, vinyl esters, phenolic resins, polyimides, or polystyrylpyridine (PSP). Alternative embodiments of the present invention could use thermoplastic polymers such as poly(ethyleneterephthalate) (PET) and nylon-66.

Fabrication of the Reinforcing Panels

As discussed in the prior art, pultrusion is a fabrication process wherein synthetic fibers are wetted in resin and pulled through a heated die to cure the resin which encases the synthetic fibers. Prior art pultrusion fabrication processes use a substantial number of fibers aligned obliquely to the longitudinal axis of the direction of the pull to provide lateral strength for the pultruded product. In addition, prior art pultrusion processes are carefully controlled to ensure sufficient resin to prevent exposing any of the structural fibers. Also, prior art pultrusion processes do not treat the pultruded product in a way that would expose fibers because it is well known in the reinforced plastics industry that exposed fibers weaken the product and cannot be used where it would be exposed to environmental elements or people.

Figure 11:
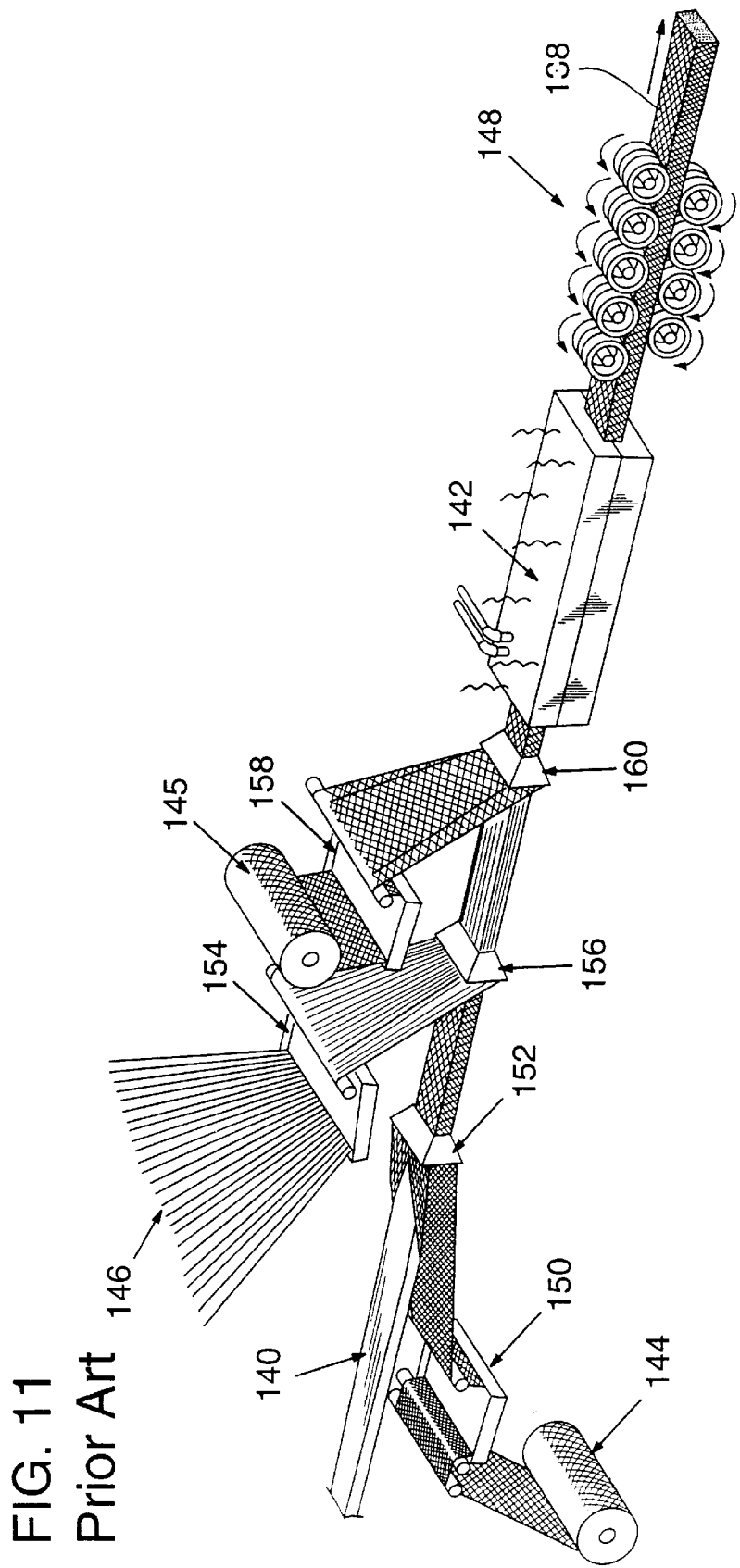
FIG. 11 is a perspective view of a prior art pultrusion fabrication process.

With reference to FIG. 11 the prior art pultrusion process will be explained. The pultrusion process shown in FIG. 11 is set up to fabricate a hollow rectangular section member thus requiring a mandrel 140 to maintain the hollow core during the pultrusion process. The prior art pultrusion process comprises upper and lower mats 144, 145 respectively, that are typically woven rovings or woven fabric. There is also a plurality of rovings 146 that may be longitudinally aligned with the structural member being formed and are sandwiched between the woven mats. Puller 148 provides the force that pulls the fibers through the process.

Thus, beginning with lower woven mat 144, the mat is pulled through a resin bath 150 and formed around mandrel 140 by forming die 152. The rovings 146 are likewise wetted in a resin bath 154 and formed around the mandrel/mat combination by forming die 156. Thereafter, upper woven mat 145 is wetted in a resin bath 158 and formed around the combination of the mandrel 140, lower mat 144, and rovings 146 by forming die 160. Thereafter, the entire combination is pulled through heated die 142 which cures the resin so that the structural member 138 emerges from the die as a rigid member 138. To fabricate a solid member, the prior art pultrusion process would be modified by eliminating the mandrel 140.

Figure 12:
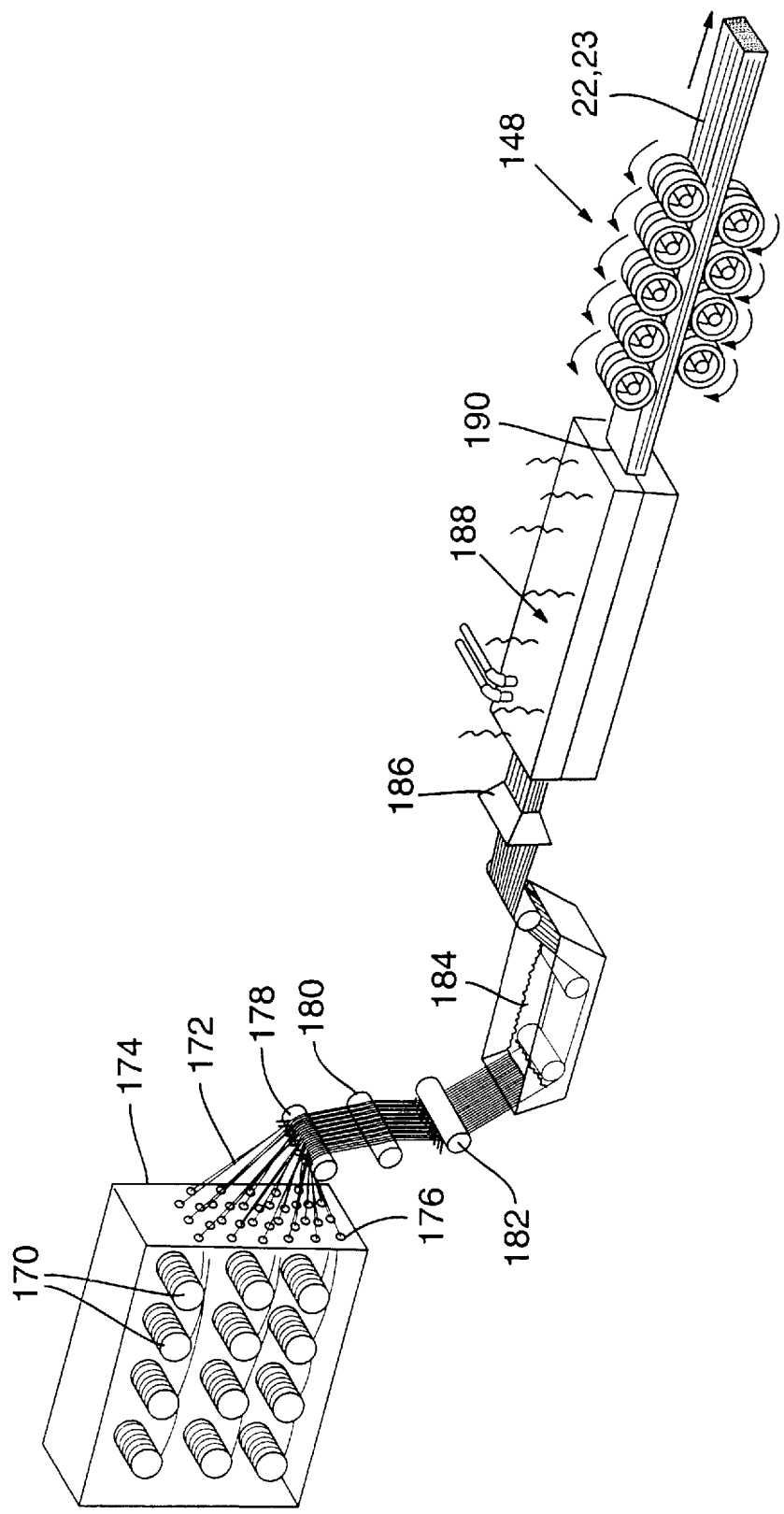
FIG. 12 is an isometric view of a pultrusion process of the present invention which produces an elongate reinforcement panel having substantially all of its fibers arranged parallel to one another and aligned with a longitudinal axis.

Referring to FIG. 12, the present invention improves upon the pultrusion process of the prior art for the purpose of fabricating the reinforcing panel 22 (or 23) of the present invention. Beginning with a plurality of bobbins 170 having synthetic fiber rovings 172 thereon, the rovings are pulled through a card 174 for alignment and to prevent entanglement of the rovings. The card 174 has a plurality of openings 176 through which the rovings 172 pass. The openings 176 are typically gasketed with a low friction material such as a ceramic or plastic to prevent any abrasion or resistance to the rovings 172 from the edges of the openings. After the rovings 172 pass through the card 174, the rovings are gathered and arranged parallel to one another by a first comb 178. After the first comb, the rovings pass over a tensioning mandrel 180 and under a second comb 182 which further maintains the parallel arrangement of the rovings 172. Thereafter, the rovings are wetted in a resin bath 184 and gathered by a forming die 186 prior to entering a heated die 188 having an orifice 190 that shapes the panel 22 (or 23). Heat from the die 188 cures the resin so that the panel which emerges is a substantially rigid member.

The prior art pultrusion process was considered desirable for fabricating continuous lengths of reinforced plastics. However, by pultruding reinforcing panels of the present invention an unexpected benefit was realized because of the ability to arrange the fibers substantially parallel to one another and aligned with the longitudinal direction of the reinforcing panel. An additional unexpected benefit of the improved pultrusion process of the present invention was the tensioning of the fibers while the resin was cured which provides two benefits. First, the tension in the fibers assists in maintaining the parallel arrangement and alignment of the fibers within the panel. Second, by curing the resin while the fibers are under tension it was found that the resulting reinforcing panel was more rigid and subsequently there was less deflection upon an initial loading of a wood beam reinforced by a reinforcing panel of the present invention. By curing the resin while the fibers were under tension the initial strain of the fibers was set during the fabrication process and, accordingly, when the reinforcing panel was adhered to a wood beam and the beam was loaded, there was less deflection than in beams using reinforcing panels made of fibers that were not in tension during the resin cure.

Experimentation has shown that the optimum tension in the fibers during the resin cure is approximately three to eight pounds. The fiber tension force is created by a back pressure on the rovings which may be accomplished by the tensioning mandrel 180 in combination with the combs 178 and 182 or by the use of friction bobbins 170 wherein the rotational friction of the bobbins may be adjusted to provide the desired back pressure on the rovings.

Referring to FIG. 13, fabrication of reinforcing panel 122 (or 123) is substantially the same as fabrication of reinforcing panel 22, except as follows. Cellulose surface materials 131a and 131b stored on respective rolls 192a and 192b are located above and below the forming die 186. The surface materials 131a and 131b are impregnated with a polymer resin in respective polymer resin baths 194a and 194b. Thereafter, both cellulose surface materials 131a and 131b feed into the forming die 186, are pressed into contact with the wetted fibers, and are co-cured with the panel 122. The tension on the surface materials 131a and 131b is 2–3 pounds to maintain tension. The preferred rate of curing is 2–3 feet per minute, though rates from at least 6 inches per minute to 5 feet per minute are possible.

Alternatively, as previously mentioned, the cellulose surface material, after impregnation with a polymer resin, could be adhesively adhered in a post-cure process to a previously cured panel. As such, the cellulose surface material would be adhesively connected to the panel, preferably by passing the cured panel and wet impregnated cellulose surface material through a heated curing die.

Another alternative, as previously mentioned, involves eliminating the polyester resin baths 194a and 194b and co-curing the cellulose surface material with the panel while permitting the resin from the panel to impregnate the cellulose surface material.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A wood structural member having plural wood segments attached to form a unitary structure, comprising:

multiple fiber reinforcements, each of which including plural strands of fibers held within a resin casing having first and second major surfaces in which certain strands of the fibers of each fiber reinforcement present at its first and second major surfaces constitute surface fibers, at least one of the fiber reinforcements being bonded by a nonepoxy adhesive to at least one of the wood segments of the wood structural member, and each of the major surfaces of the resin casing to which a wood segment is adhered by nonepoxy adhesive is a conditioned surface to provide for the nonepoxy adhesive an effective bonding interface between the fiber reinforcement and the wood segment, wherein at least one of the major surfaces to which a wood segment is adhered by nonepoxy adhesive is conditioned so that the surface fibers protrude from the resin encasement.

2. The wood structural member of claim 1 in which the fibers are selected from a group consisting of carbon, high modulus polyethylene, fiberglass, and aramid fibers.

3. The wood structural member of claim 1 in which at least one of the fiber reinforcements has a longitudinal axis and substantially all of the fibers are arranged substantially parallel with one another and aligned with the longitudinal axis.

4. The wood structural member of claim 1 in which at least one of the fiber reinforcements has a longitudinal axis and includes two layers of fibers, a first layer being arranged as a mat of fiber strands that overlays a second layer of fibers, the mat including fiber strands arranged obliquely to the longitudinal axis and substantially all the fibers of the second layer arranged substantially parallel with one another and aligned with the longitudinal axis.

5. The wood structural member of claim 4 in which the fibers are selected from a group consisting of carbon, high modulus polyethylene, fiberglass, and aramid fibers.

6. The wood structural member of claim 1 in which the fiber reinforcements constitute a first fiber reinforcement and a second fiber reinforcement, each of the first and second fiber reinforcements being bonded by a nonepoxy adhesive to a different wood segment of the plural wood segments.

7. The wood structural member of claim 1 in which each of the fiber reinforcements is bonded to at least one of the wood segments.

8. The wood structural member of claim 1 in which at least one of the fiber reinforcements is adhered between a pair of the wood segments.

9. The wood structural member of claim 1 configured as a glue laminated wood beam, a wood I-beam, a wood truss, solid wood, laminated veneer, parallel strand wood, oriented strand board, or reconstituted fiber lumber.

10. The wood structural member of claim 1 in which the plural strands of the fibers are held together as a panel.

11. The wood structural member of claim 1 in which the nonepoxy adhesive includes resorcinol.

12. The wood structural member of claim 1 in which the nonepoxy adhesive includes phenol resorcinol, formaldehyde resorcinol, melamine, PVA, isocyanate, polyurethane, or a urea-based adhesive.

13. A wood structural member having plural wood segments attached to form a unitary structure, comprising:

multiple fiber reinforcements, each of which including plural strands of fibers held within a resin casing having first and second major surfaces, at least one of the fiber reinforcements being bonded by a nonepoxy adhesive to at least one of the wood segments of the wood structural member, and each of the major surfaces of the resin casing to which a wood segment is adhered by nonepoxy adhesive is a conditioned surface to provide for the nonepoxy adhesive an effective bonding interface between the fiber reinforcement and the wood segment, and in which at least one of the major surfaces to which a wood segment is adhered is conditioned by bonding cellulose material on the major surface to provide a cellulose material-to-wood segment interface.

14. The wood structural member of claim 13 in which the fibers are selected from a group consisting of carbon, high modulus polyethylene, fiberglass, and aramid fibers.

15. The wood structural member of claim 13 in which at least one of the fiber reinforcements has a longitudinal axis and substantially all of the fibers are arranged substantially parallel with one another and aligned with the longitudinal axis.

16. The wood structural member of claim 13 in which at least one of the fiber reinforcements has a longitudinal axis and includes two layers of fibers, a first layer being arranged as a mat of fiber strands that overlays a second layer of fibers, the mat including fiber strands arranged obliquely to the longitudinal axis and substantially all the fibers of the second layer arranged substantially parallel with one another and aligned with the longitudinal axis.

17. The wood structural member of claim 16 in which the fibers are selected from a group consisting of carbon, high modulus polyethylene, fiberglass, and aramid fibers.

18. The wood structural member of claim 13 in which the fiber reinforcements constitute a first fiber reinforcement and a second fiber reinforcement, each of the first and second fiber reinforcements being bonded by a nonepoxy adhesive to a different wood segment of the plural wood segments.

19. The wood structural member of claim 13 in which each of the fiber reinforcements is bonded to at least one of the wood segments.

20. The wood structural member of claim 13 in which at least one of the fiber reinforcements is adhered between a pair of the wood segments.

21. The wood structural member of claim 13 configured as a glue laminated wood beam, a wood I-beam, a wood truss, solid wood, laminated veneer, parallel strand wood, oriented strand board, or reconstituted fiber lumber.

22. The wood structural member of claim 13 in which the plural strands of the fibers are held together as a panel.

23. The wood structural member of claim 13 in which the nonepoxy adhesive includes resorcinol.

24. The wood structural member of claim 13 in which the nonepoxy adhesive includes phenol resorcinol, formaldehyde resorcinol, melamine, PVA, isocyanate, polyurethane, or a urea-based adhesive.

25. A wood structural member having plural wood segments attached to form a unitary structure, comprising:

multiple fiber reinforcements, each of which including plural strands of fibers held within a resin casing having first and second major surfaces, at least one of the fiber reinforcements being bonded by a nonepoxy adhesive to at least one of the wood segments of the wood structural member, and each of the major surfaces of the resin casing to which a wood segment is adhered by nonepoxy adhesive is a conditioned surface to provide for the nonepoxy adhesive an effective bonding interface between the fiber reinforcement and the wood segment, wherein at least one of the fiber reinforcements has a longitudinal axis and includes two layers of fibers, a first layer being arranged as a mat of fiber strands that overlays a second layer of fibers, the mat including fiber strands arranged obliquely to the longitudinal axis and substantially all the fibers of the second layer arranged substantially parallel with one another and aligned with the longitudinal axis.

26. The wood structural member of claim 25 in which the fibers are selected from a group consisting of carbon, high modulus polyethylene, fiberglass, and aramid fibers.

27. The wood structural member of claim 25 in which at least one of the fiber reinforcements has a longitudinal axis and substantially all of the fibers are arranged substantially parallel with one another and aligned with the longitudinal axis.

28. The wood structural member of claim 25 in which certain strands of the fibers of the fiber reinforcement present at its first and second major surfaces constitute surface fibers and in which at least one of the major surfaces to which a wood segment is adhered by nonepoxy adhesive is conditioned so that the surface fibers protrude from the resin encasement.

29. The wood structural member of claim 25 in which at least one of the major surfaces to which a wood segment is adhered has been conditioned by bonding cellulose material on the major surface to provide a cellulose material-to-wood segment interface.

30. The wood structural member of claim 25 in which the fiber reinforcements constitute a first fiber reinforcement and a second fiber reinforcement, each of the first and second fiber reinforcements being bonded by a nonepoxy adhesive to a different wood segment of the plural wood segments.

31. The wood structural member of claim 25 in which each of the fiber reinforcements is bonded to at least one of the wood segments.

32. The wood structural member of claim 25 in which at least one of the fiber reinforcements is adhered between a pair of the wood segments.

33. The wood structural member of claim 25 configured as a glue laminated wood beam, a wood I-beam, a wood truss, solid wood, laminated veneer, parallel strand lumber, oriented strand board, or reconstituted fiber lumber.

34. The wood structural member of claim 25 in which the plural strands of the fibers are held together as a panel.

35. The wood structural member of claim 25 in which the nonepoxy adhesive includes resorcinol.

36. The wood structural member of claim 25 in which the nonepoxy adhesive includes phenol resorcinol, formaldehyde resorcinol, melamine, PVA, isocyanate, polyurethane, or a urea-based adhesive.

* * * * *